No. 779,637. Patented January 10, 1905.

UNITED STATES PATENT OFFICE.

CARL CHRISTIAN LEOPOLD GETHER BUDDE, OF COPENHAGEN, DENMARK.

METHOD OF STERILIZING ORGANIC SUBSTANCES.

SPECIFICATION forming part of Letters Patent No. 779,637, dated January 10, 1905.

Application filed November 3, 1902. Serial No. 129,984.

*To all whom it may concern:*

Be it known that I, CARL CHRISTIAN LEOPOLD GETHER BUDDE, a citizen of the Kingdom of Denmark, residing at Copenhagen, Denmark, have invented certain new and useful Improvements in Methods of Sterilizing Organic Substances, of which the following is a specification.

The sterilization of articles of food and the like is easiest effected by heating the same to a temperature of from 80° to 100° centigrade, (pasteurizing or boiling.) At such an intense heating, however, the organic substances present in the articles undergo different chemical changes which impart to the substances treated in this manner other chemical and physical properties (odor, taste, solubility) than they possessed in their original state. Albuminous substances and other substances closely related to them especially cannot stand boiling to a higher temperature than from 50° to 60° centigrade without changing properties to a great extent, (coagulation, &c., usually resulting,) and this temperature not being sufficiently high to kill the bacteria generally present in articles of food it is obvious that it is impossible to sterilize such articles by ordinary heating in such a manner that they retain their original properties. There are also other methods of sterilizing articles of food by the addition of various antiseptics, (hydric borate, salicylic acid, salt, sugar, vinegar, smoke, &c.) By employing these methods the same thing will happen as was above mentioned with regard to pasteurizing—viz., that the articles of food undergo a change in properties and also absorb various foreign matters. What is mentioned about the pasteurizing may be said of some of the other hitherto known methods of sterilizing articles of food, and of all of them may be said that the employment of them require a more or less complicated and expensive apparatus, special receivers for keeping the articles of food, and a difficult manipulation.

The present invention is based on the fact that oxygen in the nascent state at a temperature of not less than 40° centigrade has an absolutely killing effect on all microbes and spores generally present in articles of food and even on cells so capable of resistance as the spores of bacillus subtilus and others, which are not killed by boiling in water. It is generally known that oxygen in the nascent state has a greater chemical effect than free oxygen, the reason of which is generally thought to be that the oxygen in this case operates on free atoms. That this greater effect also has its play against living microbes may at once be imagined and has been fully proved by many experiments. Experiments have, however, shown that most microbes may very well bear its effect at an ordinary temperature and even at a temperature not exceeding 40° centigrade, although they are somewhat checked in their growth for a shorter period, while none of them are able to resist a temperature of 40° centigrade or more.

The easiest way of exposing articles of food to the effect of oxygen in the nascent state is to bring them in contact with a reasonable quantity of hydrogen peroxid. It is known that in many articles of food there are certain organic matters (enzyms, fibrin, and the like) which are able to decompose hydrogen peroxid into water and oxygen without being changed themselves. If, therefore, articles of food at a temperature of 40° centigrade or more are brought in contact with just such a quantity of hydrogen peroxid as the organic substances in them are able to decompose into oxygen and water, all the microbes are killed, and the articles of food will not after the sterilization contain any foreign matter and their physical and chemical properties will suffer no change whatever. Neither hydrogen peroxid nor oxyen in the nascent state are, in fact, able, at least not by influences of such short duration as the present process will demand, to affect the principal ingredients of the articles of food—viz., the albuminous substances and other substances closely related to them, carbonic hydrates, and fatty substances. The antiseptic influence of the hydrogen peroxid is well known, and it has previously been attempted to use it for sterilization of articles of food; but as people have been ignorant of the absolutely killing effect on microbes of hydrogen peroxid at a temperature above 40° centigrade, as herein described, the said experiments have given but very unsatisfactory results, as it has only been possible, although large quantities of hydrogen peroxids were used, to render the microbes inactive for a short time.

For greater clearness will now be described how, for instance, milk is treated according to the present method. As soon as possible after the milking a solution in water of hydrogen peroxid is added to the milk until the latter contains 0.9 of a gram $H_2O_2$ per liter. The solution is well mixed with the milk by stirring or shaking. The milk is then heated to a temperature of about 50° centigrade. When the process has gone on for five to six hours at this temperature, the milk is free from hydrogen peroxid and perfectly sterile. As, however, the portion of the hydrogen peroxid which is decomposed before the milk has attained a temperature of about 40° centigrade is without the intended effect, it is more economical first to heat the milk to a temperature of about 50° centigrade and then add so much solution of hydrogen peroxid that the milk contains 0.35 of a gram $H_2O_2$ per liter, on which the milk is stirred or shaken and kept at the said temperature for some hours, as described above. If more hydrogen peroxid is added than the quantity mentioned above, the sterilized milk will contain the non-decomposed surplus, and this surplus cannot be removed even by continuous boiling. It may, however, be removed by adding minimized quantities of enzyms or similar organic matter—for instance, an infusion of common press-yeast. If the milk is not previously heated, the quantity of hydrogen peroxid that has to be added somewhat depends on the time which elapses before the milk reaches the temperature required and on the age of the milk. The above-mentioned proportion (of 0.9 of a gram $H_2O_2$ per liter) is only correct when the milk is one day old and is heated as quickly as possible by the immersion of the milk-reservoir in a large quantity of water which has beforehand been heated to the proper temperature. It must be noted that it is necessary to remove an eventual surplus of hydrogen peroxid, partly to prevent the milk when it gets into the market containing hydrogen peroxid and partly because a surplus of hydrogen peroxid when the milk is kept for a longer period will affect the fatty substances in it and cause the milk to lose in some degree its original flavor and to adopt a peculiar disagreeable taste.

The above-described sterilization may be accomplished in vessels of any kind whatever; but for practical reasons firmly-closed reservoirs are to be recommended, whereby it is easier to avoid the infection of the milk by the air after the sterilization. Common glass jars and tin cans may very well be used.

Should it be desired to keep the milk in condensed state, it is treated as described above, with the exception that it is then placed in a vacuum apparatus when the hydrogen peroxid has been added and evaporates as much as required at the temperature herein mentioned, after which the milk thus condensed and still containing hydrogen peroxid is placed in the receivers in which it is to be kept and is then together with these exposed to a temperature of 50° centigrade for some hours, after the lapse of which the milk will be perfectly sterile and free from hydrogen peroxid.

What is said about milk may be made to embrace the treatment of other articles of food containing certain organic matters (enzyms, fibrin, and the like) which are able to decompose hydrogen peroxid if only the quantity of hydrogen peroxid and the temperature are somewhat varied, according to the nature of the article which is to be sterilized. It might, for instance, be mentioned that cream decomposes at a mixture of about 1.95 grams $H_2O_2$ per liter; if not previously heated, common lager-beer at 0.9 of a gram $H_2O_2$ per liter. Solid articles of food—such as meat, fish, vegetables, minced meat, and the like—are laid in or kneaded together with a very much diluted solution of hydrogen peroxid and then treated in the manner hereinbefore mentioned in the case of milk.

It is a matter of consequence that milk and the like, specially liquid articles of food the power of decomposing hydrogen peroxid of which depends on their contents of enzym, may be treated according to this method only at temperatures which the enzyms can stand without being hurt—that is to say, at a temperature not exceeding 60° to 70° centigrade. Articles, as meat, fish, vegetables, and the like, which besides enzym contain other matters able to decompose hydrogen peroxid are, however, treated according to the present method at much higher temperatures.

In this description the term "enzym" has been used to designate a class of organic bodies having the characteristic property of decomposing hydrogen peroxid, yet there are other organic bodies which possibly cannot properly be included under the term "enzym" having this property—as, for example, fibrin—and for the purpose of this invention are equivalents.

I claim—

1. A method of sterilizing food consisting in subjecting food containing an enzym together with hydrogen peroxid to the action of heat the intensity of which is not less than 40° centigrade and not more than that which will render said enzym inactive, thereby effecting sterilization of said food.

2. A method of sterilizing food consisting in heating food containing an enzym to not less than 40° centigrade, then adding hydrogen peroxid and subjecting said food containing said peroxid to the action of heat not exceeding that which will render inactive said enzym, thereby effecting the sterilization of said food.

3. A method of sterilizing food consisting in subjecting food containing an enzym together with hydrogen peroxid to heat the intensity of which is not less than 40° centigrade, and then adding an enzym to decompose any surplus of said peroxid.

4. A method of sterilizing food consisting in subjecting food containing an enzym together with hydrogen peroxid to the action of heat at not less than 40° centigrade and adding an organic substance to decompose any surplus of said peroxid.

In testimony that I claim the foregoing as my invention I have signed my name in presence of two subscribing witnesses.

CARL CHRISTIAN LEOPOLD GETHER BUDDE.

Witnesses:
    H. CHR. NIELSEN,
    VIGGO BLOM.